United States Patent
Vu et al.

(10) Patent No.: US 6,499,040 B1
(45) Date of Patent: Dec. 24, 2002

(54) DOCUMENT AND TASK COORDINATION SYSTEM FOR A COMPUTER

(75) Inventors: Duy-Minh Vu, Puteaux (FR); Alain Nicolas, Paris (FR); Francois Perroux, Sevres (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

(21) Appl. No.: 09/263,146

(22) Filed: Mar. 5, 1999

(51) Int. Cl.$^7$ .............................................. G06F 17/00
(52) U.S. Cl. .................... 707/502; 707/515; 707/104.1; 345/779
(58) Field of Search .............................. 707/515, 516, 707/502, 104.1; 345/661, 779, 762–3, 771, 964; 700/182, 180; 709/321, 323, 328, 329

(56) References Cited

U.S. PATENT DOCUMENTS

| | | | |
|---|---|---|---|
| 5,301,318 A | * | 4/1994 | Mittal ...................... 707/104.1 |
| 5,517,607 A | * | 5/1996 | Nishimura et al. ......... 345/781 |
| 5,533,148 A | * | 7/1996 | Sayah et al. ................ 382/240 |
| 5,740,455 A | | 4/1998 | Hanson et al. |
| 5,754,175 A | | 5/1998 | Koppolu et al. |
| 5,806,079 A | | 9/1998 | Ahn et al. |
| 5,812,862 A | | 9/1998 | Stern et al. |

FOREIGN PATENT DOCUMENTS

EP 0 843 255 5/1998

OTHER PUBLICATIONS

Rashid et al, "Experience in Using Electronics Workbench", Frontiers in Education Conference, Proceedings, 1997, IEEE, vol. ISBN: 0–7803–4086–8, p. 22.*

Aouad, G. et al, "Developing a Conceptual Model for an Intergrated Database", Intelligent Information Systems, 1997, Proceedings, IEEE, ISBN: 0–8186–8218–3, pp. 316–320.*

Daniel, J., "An Object Oriented Approach to CAD Tool Control within a Design Framework", Proceedings of the 1989 26th ACM/IEEE Conference on Design Automation Conference Jun. 1989, ACM 0–89791–310–9/89/0006/0197, pp. 197–202.*

* cited by examiner

Primary Examiner—Joseph H. Feild
(74) Attorney, Agent, or Firm—James V. Mahon; Clifford Chance US LLP

(57) ABSTRACT

A computer system operation method for allowing a user to work on interrelated documents includes forming groups of software tools. Different groups of software tools are used to perform different tasks on documents in a software system. Documents in the software system have different document types. The document types are functionally associated with the different groups of software tools. The method monitors a user's selection of a second group of software tools, when the user is using a first workbench to work on data contained in a first document. The method invokes a second document, upon the user's selection of a second group of software tools. The second document is of a document type that is associated with the second workbench.

26 Claims, 12 Drawing Sheets

DOCUMENT AND TASK COORDINATION SYSTEM FOR A COMPUTER

BACKGROUND

Computer systems can store data and information in data files or data sets, often referred to as documents. Documents may be stored temporarily in the computer's memory (e.g. RAM, ROM) while the computer is operating, or may be stored more permanently on a physical medium (e.g. a hard disk or a floppy-disk) from which they may be retrieved for use with the computer. Documents can store a variety of data types including image files, presentations, text documents, databases, sound files, and spreadsheets.

Data in a document can be created, accessed, and modified by a software application. Different applications may be associated with different document types and may include software tools to create, edit, or modify data in the associated document type. For example, a user may create a text document with a word processing application, such as Microsoft Word®, and may use tools, such as those found in the Microsoft Word "File" pull-down menu (e.g. the "new," "save," "print" tools), to create, store, and print the text document. Similarly, a user may create a spreadsheet document with a spreadsheet application, such as Microsoft Excel®, and may use mathematical function tools to analyze data in the spreadsheet document and may use graphing tools to graphically present data contained in the spreadsheet document. The appearance and utility of the text and spreadsheet documents is determined by tools in the associated word processing and spreadsheet applications.

Generally, when a user works on a document using the tools of an associated application, only documents of the type associated with the chosen application may be created or modified. For example, when using a word processing program only text documents may be created and modified, and when using a spreadsheet program only spreadsheet documents may be worked on. Thus, application functionality may conform to a document-centric model. A document-centric model of applications suggests a user understanding that certain applications are limited to certain document types and vice-versa.

A document-centric application model can be restrictive to the user when the user wishes to perform multiple tasks that require multiple applications and, therefore, the use of multiple document types. For example, if a user is using one application to work on a document and perform a task, but wishes to perform a related but different task that requires different tools, the user must use tools from a second application. The use of a second application may entail exiting the current document, opening a second document of a type compatible with the second application and performing the desired task in the second document. The user may store the results of the two applications in two documents of different document types.

When documents are independently stored, working on one document in one application does not automatically recall the other related document. Rather, recalling the other related document requires using a different application to retrieve the related document. Thus, the user may need to manually maintain a cataloging system to remember that the two different documents contain related data and information.

Document embedding may be used as an alternative to separate storage of related documents. Embedding may be supported by an operating system or a software application. For example, in a Microsoft Windows 95/98™ implementation, object linking and embedding (OLE) technology is often used to enable the importation and embedding of a secondary document into a primary document. Nevertheless, this requires a user using a primary program first to correctly determine the secondary document type to be imported, second to open such a document, third to insert into the secondary document the data he wants to work on, fourth to use the secondary program to edit the secondary document, and fifth to import the second document into the primary document. This is a long and cumbersome process. Thus, for example, a user may use a word processing application to create a text document and a spreadsheet application to create or modify a spreadsheet document that may be imported into and stored in a text document, but the processing is not user-friendly.

When a user uses a primary software application to work on a document of a particular type associated with the software application, the user may create an object embedded within the document, which may be edited with the tools of a secondary application that is not associated with the particular document type. An object in an application environment may be a discrete element of a document, for example, a spreadsheet, a graphic, or a piece of text. Graphical space is allocated in the document for the object, and the object is stored as part of the document. A user's selection of an object contained within a document may activate a secondary application to edit the data contained in the object. For example, when using Microsoft Word® to work on a text document, a user may create a spreadsheet object in the text document and edit the spreadsheet with the Microsoft Excel® tools. Selection of the spreadsheet object in the Words® document may activate the Excels® tools to edit the spreadsheet. When objects conforming to one document type are embedded in a document of a different type, however, only one document type is created. The single document stores the results of the multiple different applications that conform to different document types. As a consequence, in the example described above, the text and the spreadsheet work would be stored in a text document because the user had been using a word processing program as the primary application. In a group work environment in which multiple users need access to multiple documents on a computer, storing the results of many different tasks in a single document may restrict access and productivity. It may have the effect of making fewer documents simultaneously available to the users, or of forcing users with expertise and experience in using different applications to all use the same document with their applications.

The functional relationship between applications and document types and the document-centric application model is further demonstrated by the way applications and document types are used by standard operating systems (e.g. Microsoft NT, Microsoft Windows). An application is opened, i.e. initialized and displayed on a computer display so that the user may begin working with the application, by typing an instruction at a command line of the operating system or by clicking with a mouse on an icon representing the application. When the application is opened it may display a window, in which a document may be displayed and worked on with the tools of the application. Normally when an application is opened it automatically displays in a window of the computer display a document of a type that is associated with the application. The document may be one that was previously created and then stored on the computer or it may be a new, blank document that the user may modify with the application's software tools and then save. Thus, opening an application with the operating system may automatically open a document of the type associated with the application.

Similarly, opening a document with operation system software functionality, for example by clicking on the document's icon, may automatically trigger the opening of an application that is functionally associated with the document type being opened. Thus, the document type and the associated software application are fundamentally linked.

SUMMARY

Software tools can be collected into task-oriented functional groups known as workbenchs. Workbenches may be created, for example, to perform the different tasks of editing text, designing parts, assembling parts into a machine or device, and analyzing the stresses on a part of a machine or device. Moreover, workbenches may be functionally associated with, and used to work on, particular document types. A document type may be associated with a workbench if the workbench can perform its task in the document.

In general, in one aspect, the invention features a computer system operation method for allowing a user to work on documents. The method includes using a set of hierarchically interrelated workbenches. Hierarchically interrelated sets of documents are also used by the software method, and each document has a document type associated with at least one of the workbenches. Furthermore, at least one document is invoked when a user selects a workbench. A document is invoked when either a new document is created or when an existing document on the computer system is retrieved.

Embodiments of the invention may include one or more of the following features. Different workbenches may include different software tools of a software system, and the user may determine which tools of the software system are included in each workbench. The documents created when the user selects a workbench may be of document types determined by the user's selection of the particular workbench from the set of workbenches. The computer system operation method may be a CAD/CAM/CAE software system.

In general, in another aspect, the invention features a computer system operation method for allowing a user to work on interrelated documents. The method includes monitoring a user's selection of a second workbench, when the user is using a first workbench to work on data contained in a first document; and creating a second document, upon the user's selection of a second workbench, when the second document is of a document type that is associated with the second workbench.

Embodiments of the invention may include one or more of the following features. The first and second workbenches may include different software tools of a software system, and the user may determine which tools of the software system are included in each workbench. Furthermore, the document type of the first document may differ from the document type of the second document. In addition, the second document may be of a document type determined by the user's selection of the second workbench. Upon creation of the second document, referencing data may be generated and stored in the first document, where the data reference all or part of the data in the second document. Alternatively, upon creation of the second document, referencing data may be generated and stored in the second document, where the data reference all or part of the data in the first document.

Additional embodiments of the invention may include one or more of the following features. One or more objects representative of data contained in one or more documents may be displayed in a first window of a computer display, and a second window of the computer display may be activated upon the user's selection of an object from one of the documents displayed in the first window. One or more objects representative of data contained in one or more documents may be displayed in a first window of a computer display, and a second window of the computer display may be activated upon the user's selection of a workbench. The software operation method may be a CAD/CAM/CAE software system.

In general, in another aspect, the invention features a method of operating a CAD/CAM/CAE computer system containing a plurality of software tools. Each of said software tools is used by a user to perform one or more particular actions as part of the user's use of the software system. The method includes organizing the plurality of software tools into a plurality of workbenches, each workbench including a different subset of software tools generally required by the user to perform a specific task. The method further includes defining a hierarchy among the workbenches, in which the hierarchy includes at least one reference from at least one workbench to at least one other workbench. The method additionally includes storing a record of the hierarchy on the computer system. The method further includes using a workbench to work on a document that is one of a several predetermined document types, and where the document is of a document type associated with the workbench being used.

In one embodiment of the invention, one or more workbenches are used to work on one or more documents, where each workbench is associated with at least one document type of several possible document types, and each document has a document type. A list of available workbenches is displayed to the user and the entry of a command by the user is monitored. If the command entered by the user indicates the selection of a workbench a new document may be created, where the type of the new document is associated with the selected workbench. But if the command entered by the user indicates the selection of an existing document, the existing document is retrieved and displaying to the user in the context of a workbench associated with the existing document's type.

In general, in another aspect, the invention features a computer program, residing on a computer-readable medium, including instructions for causing a computer to create a set of hierarchically interrelated workbenches and a set of hierarchically interrelated documents. Each document is of a document type that is associated with at least one of said workbenches and at least one document is created when a user selects a workbench associated with the document's type.

In general, in another aspect, the invention features, a computer program, residing on a computer-readable medium, including instructions for causing a computer to monitor a user's selection of a second workbench to use, when the user is using a first workbench to work on data contained in a first document, and to create a second document, upon the user's selection of a second workbench, when the second document is of a document type that is associated with the second workbench.

In general, in another aspect, the invention features a computer program, residing on a computer-readable medium, including instructions for operating a CAD/CAM/CAE computer software system containing a plurality of software tools. Each of said software tools may be used by a user to perform one or more particular actions as part of the user's use of the software system. The computer program includes instructions to organize the plurality of software tools into a plurality of workbenches, where each workbench contains a different subset of the plurality of software tools, and each different workbench includes the software tools generally required by the user to perform a specific task. The computer program includes instructions to define a hierarchy among the workbenches, where the hierarchy includes at least one reference from at least one workbench to at least one other workbench. The computer program stores a record of the hierarchy on the computer system. The computer program includes further instructions to use a workbench to work on a document, where the document is of a document type associated with the workbench.

Embodiments of the invention may include one or more of the following features. The computer program may include instructions to use one or more workbenches to work on one or more documents, each workbench being associated with at least one document type of a plurality of predetermined document types, and each document having a document type. The computer program may include instructions to display to the user a list of available workbenches, and to monitor the entry of a command by the user. A new document may be created if the command entered by the user indicates the selection of a workbench, the type of said new document being a document type associated with said workbench. If the command entered by the user indicates the selection of an existing document, the existing document may be retrieved and displayed to the user in the context of a workbench associated with the existing document's type.

In general, in another aspect, the invention features an apparatus for using a software system to control the creation and storage of documents. The apparatus includes an electronic digital computer system for operation with the software system; means for storing documents; means for creating a set of hierarchically interrelated workbenches; means for creating a set of hierarchically interrelated documents, where each document comprises a document type associated with at least one workbenches and where at least one document is created when a user selects a workbench associated with the document's type; and In general, in another aspect, the invention features, an apparatus for using a software system to control the creation and storage of documents. The apparatus includes an electronic digital computer system for operation with the software system; means for storing documents; means of monitoring a user's selection of a second workbench to use, when the user is using a first workbench to work on data contained in a first document; means of creating a second document, upon the user's selection of a second workbench, where the second document is of a document type that is associated with the second workbench.

In general, in another aspect, the invention features, an apparatus for using a CAD/CAM/CAE software system containing a plurality of software tools, in which the software tools may be used by a user to perform one or more particular actions as part of the user's use of the software system. The apparatus includes an electronic digital computer system for operation with the software system; means of organizing the software tools into a plurality of workbenches, where each workbench includes a different subset of software tools and each subset includes the software tools generally required by the user to perform a specific task; means of defining a hierarchy among the workbenches, where the hierarchy includes at least one reference from at least one workbench to at least one other workbench; means of storing the hierarchy on the computer system; and means of using a workbench to work on document, where the document has a document type that associated with the workbench used.

In one embodiment, the invention includes means of using one or more workbenches to work on one or more documents, where each document has a document type and each workbench is associated with at least one document type; means of displaying to the user a list of available workbenches; means of monitoring the entry of a command by the user; means of creating a new document if the command entered by the user indicates the selection of a workbench, where the document type of the new document is a document type associated with the selected workbench; means of retrieving an existing document if the command entered by the user indicates the selection of an existing document; and means of displaying the existing document to the user in the context of a workbench associated with the document type of said existing document.

The advantages of the invention include one or more of the following. The workbench environment facilitates the management and organization of documents and objects as the user of a software system performs different tasks on documents within the software system. In the workbench environment the software system automatically takes care of creating the necessary documents, and using the existing content and data, as the user switches between different tasks.

Other features and advantages of the invention will become apparent from the following description and from the claims.

DESCRIPTION

Figure 1:
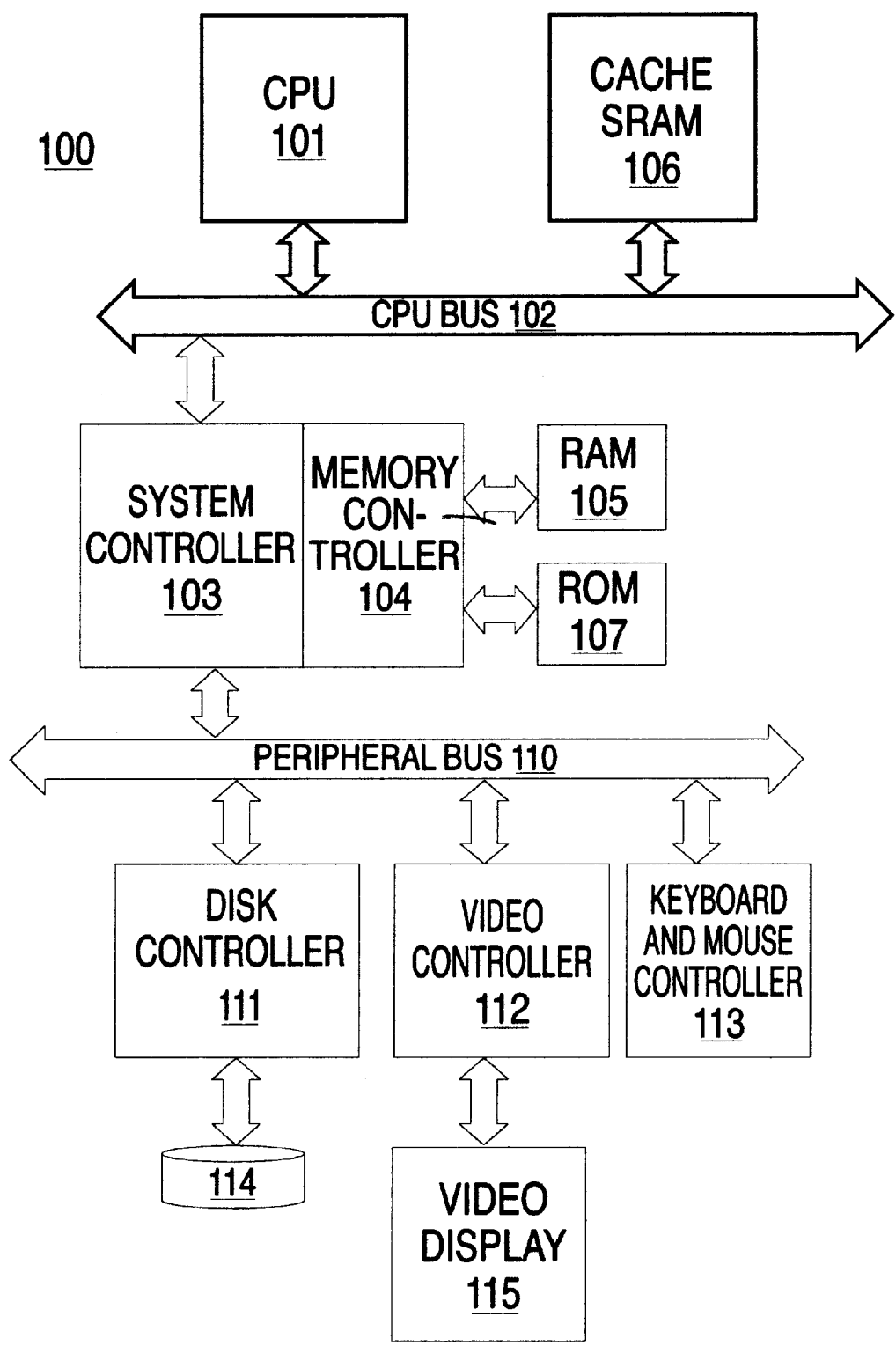
FIG. 1 is a block diagram of a computer system.

FIG. 1 illustrates elements of a computer system 100. The computer system 100 has a central processing unit (CPU) 101 connected to a processor host bus 102 over which it provides data, address and control signals. The CPU 101 may be any conventional general purpose single- or multi-chip processor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The microprocessor 101 has conventional address, data, and control lines coupling it to a processor host bus 102.

The computer system 100 includes a system controller 103 having an integrated memory controller 104. The system controller 103 is connected to the host bus 102 and provides an interface to RAM 105 and read only memory (ROM) 107. The system controller 103 also provides host bus to peripheral bus bridging functions. The controller 103 thereby permits signals on the processor host bus 102 to be compatibly exchanged with signals on a peripheral bus 110. The peripheral bus 110 may be, for example, a Peripheral Component Interconnect (PCI) bus, an Industry Standard Architecture (ISA) bus, or a Micro-Channel bus.

Accessory devices including, for example, a hard disk drive control interface 111 coupled to a hard disk drive 114, a video display controller 112 coupled to a video display 115, and a keyboard and a mouse controller 113 can be coupled to a peripheral bus 110 and controlled by the processor 101. The computer system may include a connection to a computer system network, an intranet or an internet. Data and information may be sent and received over such a connection.

ROM memory 107 may store system 100 configuration information and basic computer routines that allow an operating system to be "booted" from hard disk 114. The operating system is, for example, the Microsoft Disk Operating System (DOS)™, Windows 95/98™, Windows NT™, a UNIX operating system the Apple MacOS™ operating system, or other operating system.

An operating system may be fully loaded in the RAM memory 105 or may include portions in RAM 105, ROM 107, and in disk drive storage 114. For example, Microsoft's Windows 95™ operating system includes some functionality that remains in RAM 105 during the use of Windows 95™ and other functionality that can be periodically loaded into RAM 105 from the hard disk 114 on an as-needed basis. An operating system, such as Windows 95/98™ or Windows NT™ provides functionality to execute software applications, software systems, and tools of software systems. Software functionality can access the video display controller 112 and other resources of the computer system 100 to provide a graphical user interface (GUI) displayed on a video display 115.

Figure 2:
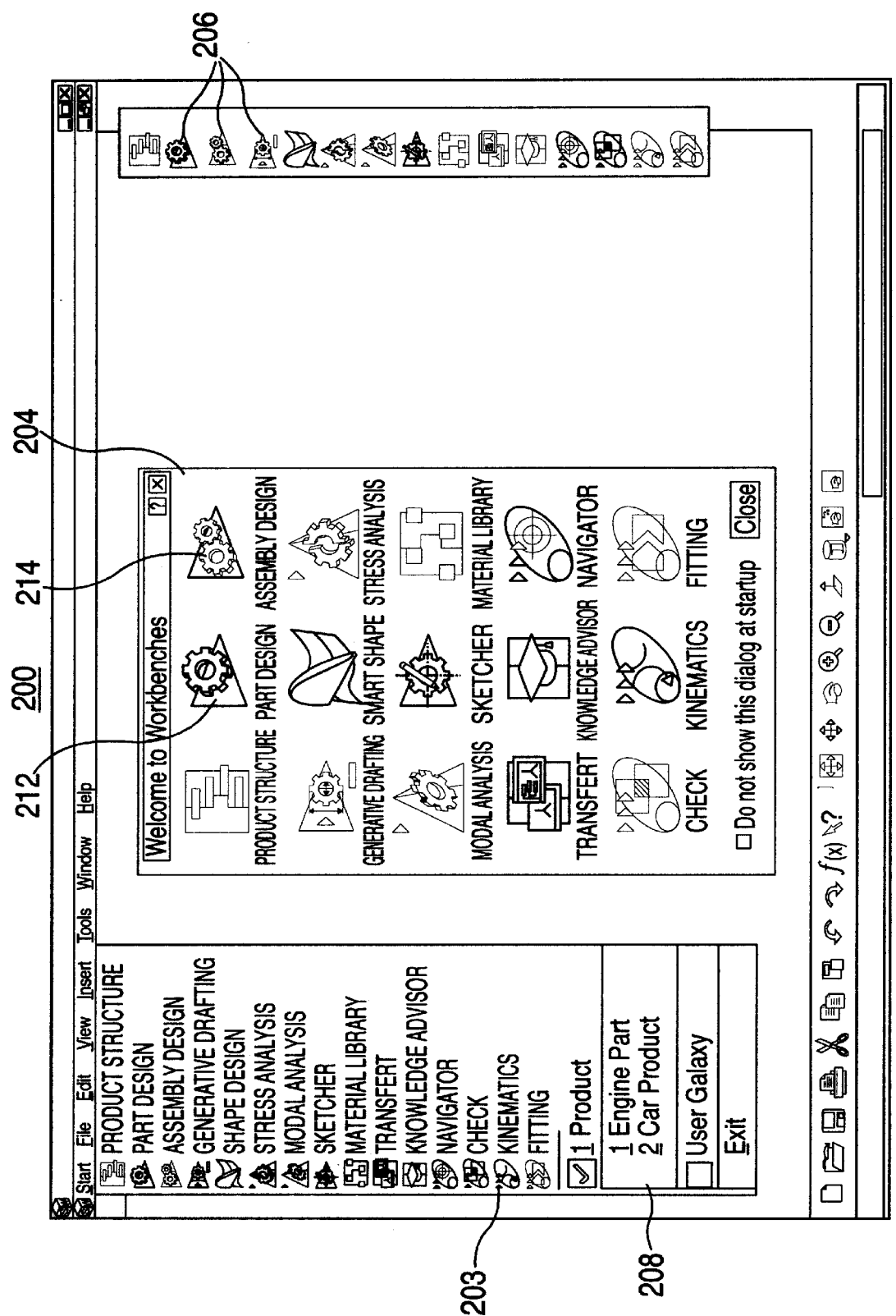
FIG. 2 is an exemplary graphical user interface software system display.

FIG. 2 shows a GUI display image 200. The image 200 shows workbenches assembled by a user through lists in the form of a menu 202, dialog boxes 204, and icons 206. Each workbench includes a task-oriented functional grouping of software tools. Workbenches may be created, for example, to perform the different tasks of editing text, designing parts, assembling parts into a machine or device, and analyzing the stresses on a part of a machine or device. For example, in a Computer Aided Design (CAD)/Computer Aided Maufacturing (CAM)/Computer Aided Engineering System (CAE) system, software tools may be grouped together to form a part design workbench 212, used to design parts, a part assembly workbench 214, used to organize the assembly of different parts into a machine or device, and a product structure workbench to define a product or machine on a macroscopic level.

Tools in a software system may be individually selected by the user to be part of one or more task-specific workbenches. The software system may permit any user to create or modify a workbench of software tools, or may reserve permission to create or modify the software tools in a workbench to a system administrator, such that the tools in workbenches are standardized for all users of a software system. Once a workbench is created, it may appear as a corresponding icon 206 or menu item 203 on a computer video display 115. Workbenches are functionally associated with, and used to work on, particular document types. A document type is associated with a workbench if the workbench can perform its task in the document. Thus, the task to which a particular workbench is directed may only be performed in documents of a type with which the workbench is associated. For example, in a CAD/CAM/CAE implementation, a part workbench may be associated with a part design document.

Further referring to FIG. 2, a software system may display workbench access methods, for example, a menu 202, a dialog box 204, or an icon 206. Each access method may have a sub-menu 208 listing one or more documents usable by a particular workbench. A user may access a workbench, and the software tools within it, by clicking with a mouse on, or otherwise selecting, the workbench or its GUI representation. Upon selection of a workbench, software functionality may be activated to create, store or modify a document or object.

While using the tools of a particular workbench to modify a current document or object associated with the particular workbench and opened in a current window of the video display 115, the user may access other workbenches through menus 202, dialog boxes 204, or icons 206. The user may select a different workbench in order to perform a task on the current document, on a different document, or on an object within either the current or a different document. The selection of a different workbench to perform a task may trigger software functionality to create a new document, to create a new window in which to perform the task, or to open an existing document or window in which to perform the task.

When selection of a of a workbench triggers software funtionality to open a document, retrieve an existing document, or open an existing document, the workbench invokes the document.

Figure 3:
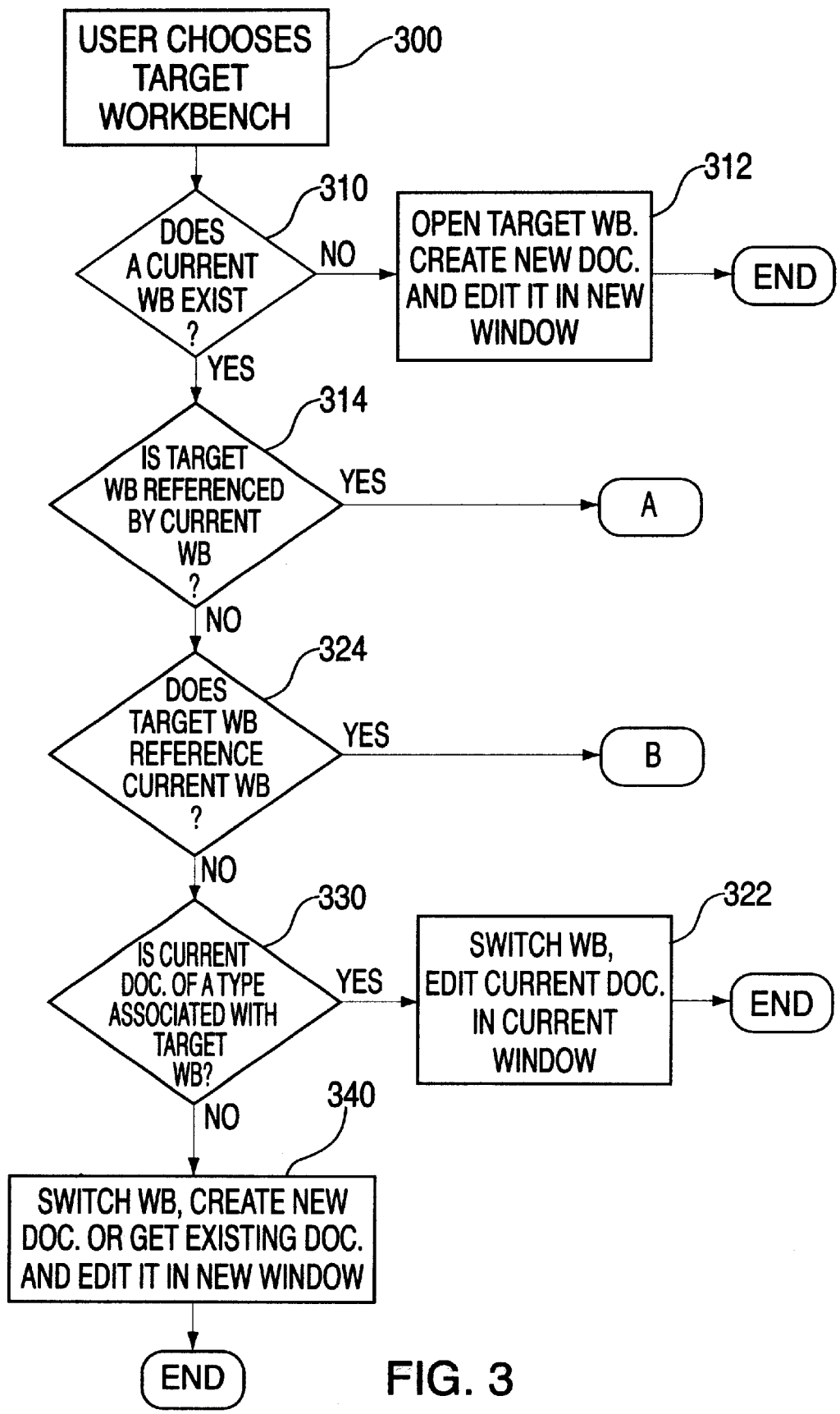
FIG. 3 is a flow-chart of the software system functionality.

Referring to FIG. 3, the workbench-enabled software system includes processes to help a user who is performing a task with one workbench begin using a different workbench to perform a different task (step 300). The different task is often related to the task the user had been performing before switching to the different workbench. The workbench currently in use is designated the current workbench and the selected workbench is designated the target workbench. If the user had not already been using a workbench prior to selecting the target workbench, then the software system simply opens the target workbench, creates a new document and edits in a new window (step 312). A default workbench may be assigned automatically when the software system is initialized, such that the question in step 310 cannot be answered in the negative. For example, in a CAD/CAM/CAE implementation, the default workbench may be a product structure workbench and the user may be required to choose either to use the default workbench or to select a different target workbench.

Further referring to FIG. 3, upon selection of a target workbench by the user, the system may check whether the target workbench is referenced by the current workbench (step 314), in which case the system enters routine A, or whether the target workbench references the current workbench (step 324), in which case the system enters routine B. Whether a workbench references, or is referenced by, another workbench is determined by the relationship between the document types and object types with which the current and target workbenches are associated. A first document or object references a second document or object when the first document or object contains data that make retrieval of the second document or object possible. Document referencing may, however, be indirect, in that a first document may reference a second document through references to one or more intermediate documents. For example, in a CAD/CAM/CAE implementation a product structure document refers to a part document if the product structure document refers to another product structure document that, in turn, refers to the part document. Similarly, objects may reference, and be referenced, indirectly. Thus, referencing refers to both direct and indirect referencing.

Figure 9:
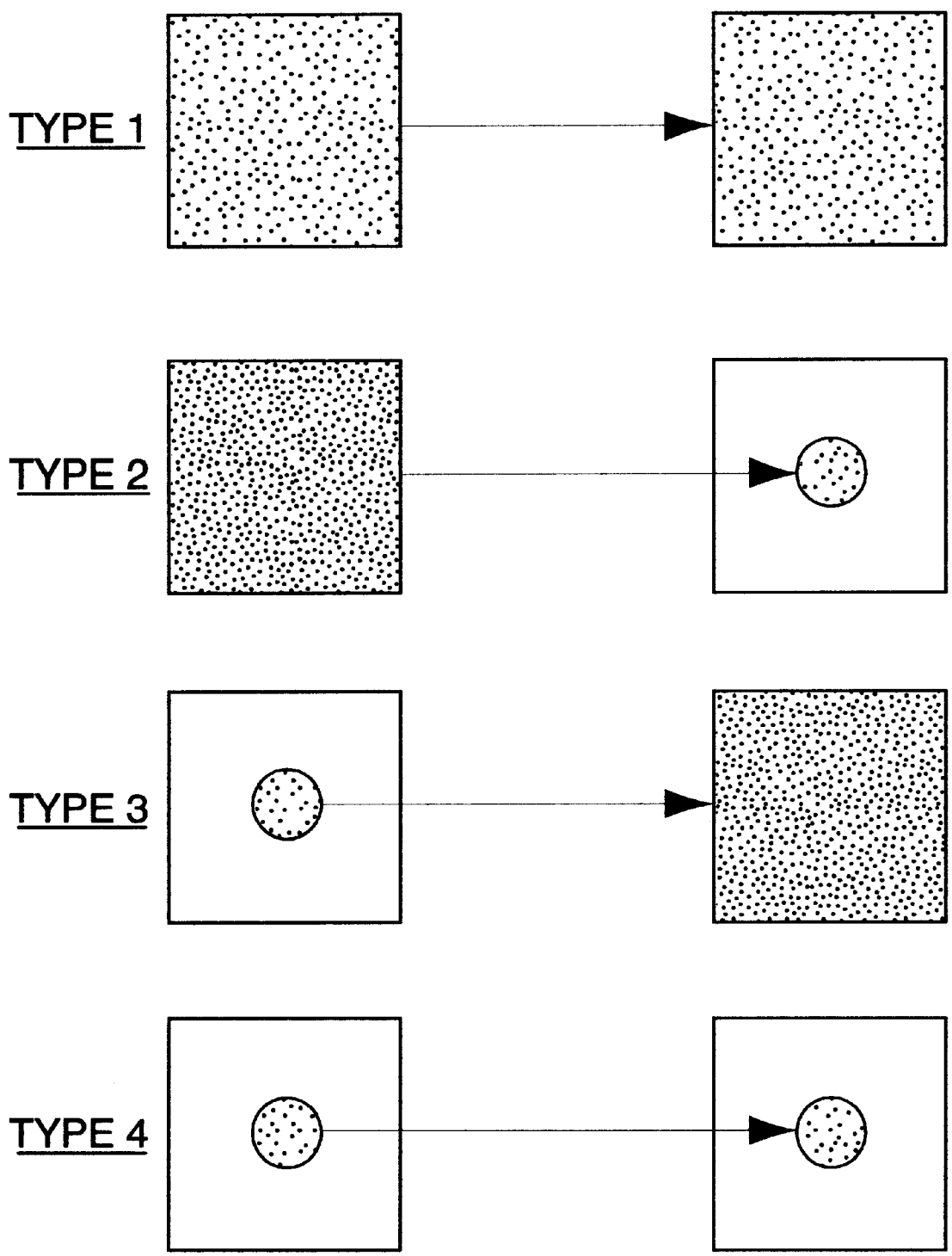
FIG. 9 depicts the hierarchical relationship between workbenches.

In addition to a document referencing another document, a document may reference an object if the document contains data that make retrieval of the object possible. Similarly an object may reference a document or another object if the object contains data that make retrieval of the document or other object possible. Thus, as shown in FIG. 9, four types of referencing are possible: Type 1 referencing, in which a document references another document; Type 2 referencing, in which a document references an object in a document; Type 3 referencing, in which an object in a document references a document; and Type 4 referencing, in which an object in a document references another object in a document.

The software system includes a way of listing, e.g. by a look-up table, for each particular workbench in the system, the workbenches that reference a particular workbench and, for each workbench-to-workbench reference, the type of reference involved. The type of reference from one workbench to another is defined by the type of referencing between documents associated with the two workbenches. Although a workbench may be associated with more than one document, only one type of referencing exists for any single workbench-to-workbench reference in the software system. In addition, referencing is not symmetrical, in that if workbench A references workbench B, workbench B does not necessarily reference workbench A. Thus, referencing between workbenches imposes a hierarchy on tasks performed, and documents used, by the software system. This hierarchy among workbenches, and the document types with which they are associated, is chosen at the time of installation of the software system and reflects the specific needs of the organizational user. The workbench hierarchy reflects the hierarchy of tasks performed by the individual organizational user of the software system. The interrelated hierarchy among workbenches, and the referencing among their associated document types, helps to provide a structure to facilitate the management of documents and objects as a user of the software system switches between workbenches that perform different tasks. If a workbench is added to the software system after the software system has been installed, the hierarchy among workbenches in the software system must be updated.

Figure 10:
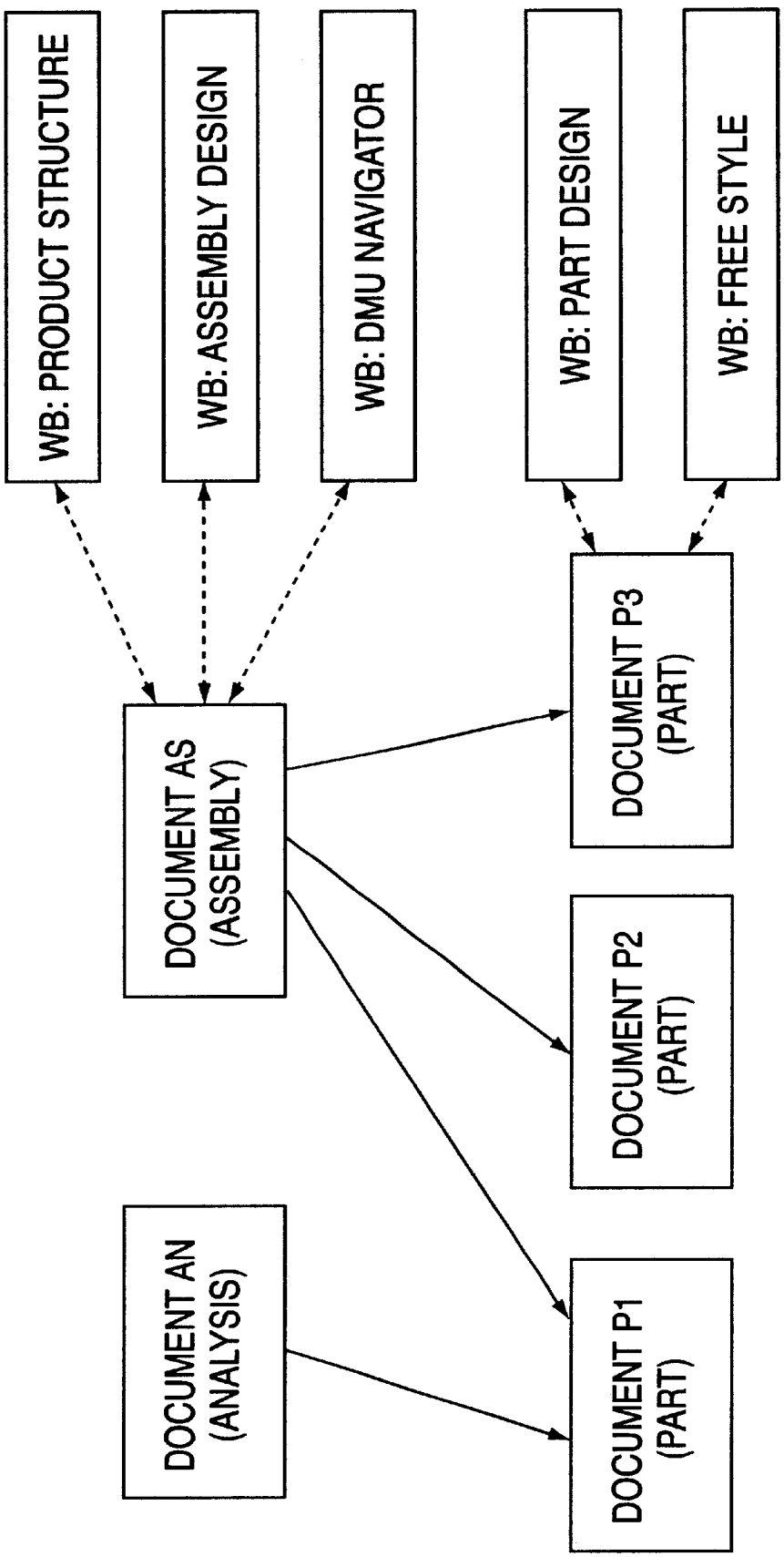
FIG. 10 depicts the hierarchical structure of document types.

Referring to FIG. 10, for example, the workbench hierarchy is further demonstrated by the fact that document types associated with different workbenches may be organized by level. A document is at a higher level than other documents that it references. A part assembly document type (e.g. Document As) references a part design document type (e.g. Documents P1, P2, P3) and uses data contained in the part design documents to organize multiple parts into a single machine or device. Thus, the part assembly document (Document As) is a higher level document than the part design documents (Documents P1, P2, P3) and references the part documents.

Again referring to FIG. 3, if the target workbench neither references, nor is referenced by, the current workbench the system checks whether the current document is of a type that is associated with the target workbench (step 330). If so, the target workbench is used to perform its task in the current document and in the current window (step 322). If the target workbench cannot perform its task in the current document then the system creates a new document or retrieves an existing document that is of a type that is associated with the target workbench and that may be worked on by the target workbench, opens the document in a new window and begins to work on it with the target workbench (step 340).

Figure 4:
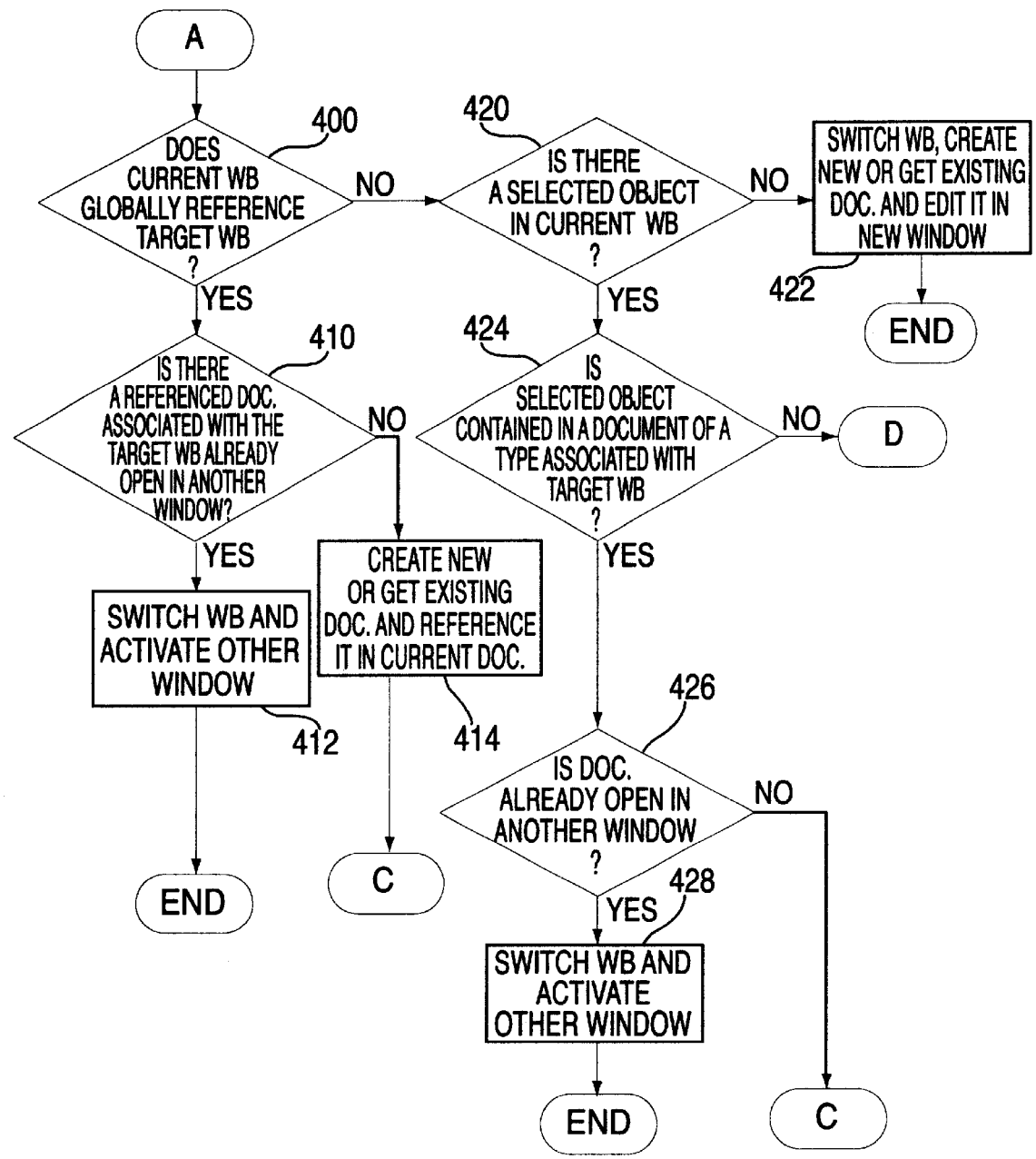
FIG. 4 is a flow-chart of the software system functionality.

Referring to FIG. 4, if the target workbench is referenced in the current workbench, then the process moves to Routine A. When the process moves to Routine A, the system checks whether the current workbench globally references the target workbench, meaning that the current workbench would be associated with an entire document that references the target workbench, as in Type 1 or Type 2 referencing (step 400). If so, the system checks if there is a referenced document associated with the target workbench already open another window (step 410); if so, the system switches to the target workbench, activates the other window and begins working on the referenced document (step 412), but if not, the system creates a new document and references it in the current (referencing) document or retrieves an existing referenced document and then proceeds to Routine C (step 414). Proceeding to Routine C after step 414 means that there exists a document associated with the target workbench referenced in the current document, but that it is not open in another window.

If the current workbench does not globally reference the target workbench (step 400) the system checks if the user has selected an object in the current document to work on with the target workbench (step 420). If not, the system switches to the target workbench, creates a new document or gets an existing document associated with the target workbench and begins editing the new document in a new window (step 422). If there is a selected object in the current workbench (step 420), the system checks if the selected object is contained in a document of a type associated with the target workbench (step 424). If not, the system proceeds to Routine D, but if so, the system checks if the document is already open in another window (step 426). If the document is already open in another window, the system activates the document in the other window and begins working on it with the target workbench (step 428), and if not the system proceeds to Routine C.

Thus, if a current workbench references a target workbench, where possible the system will activate an existing window containing either a referenced document associated with the target workbench (steps 412) or a document containing a referenced object associated with the target workbench (step 428). Otherwise, if the referenced document or object exists but not in a currently opened window the system proceeds to Routine C (step 414 or 426); and if the referenced object is not contained in a document associated with the target workbench the system proceeds to Routine D (step 424). As a final resort, the system will create a new document and edit it in a new window (step 422). The system therefore manages documents and objects according to the user's choice of task, as characterized by his choice of target workbench. The system uses the predetermined references and type of reference between workbenches to efficiently manage the display, creation, and organization of documents and objects.

Figure 5:
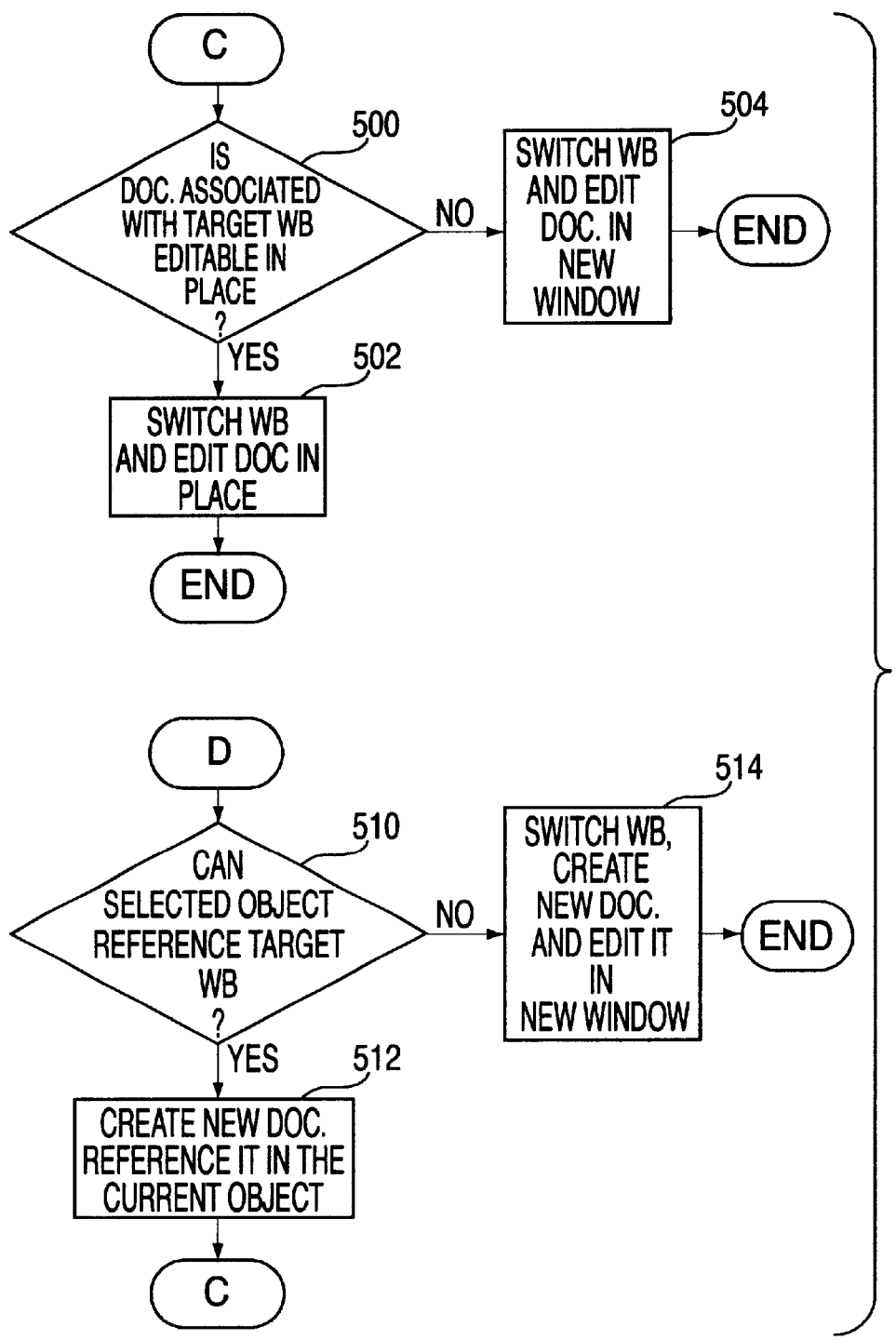
FIG. 5 is a flow-chart of the software system functionality.

Referring to FIG. 5, Routine C checks if a document associated with the target workbench is editable in place (step 500). A document is editable in place if the document is of a type that the target workbench can work on without opening a new window. Thus, if the document is editable in place, the user can continue to use the same window for the target workbench as he had been using with the current workbench. For example, in a CAD/CAM/CAE system if the current workbench is the part assembly workbench and the current document type is a part assembly document that contains multiple part design objects, the user may select a part to edit. Selection of a part may trigger the part design workbench to edit the selected part. The part design object may, however, be editable without opening a new window, in the context of the part assembly document. Thus, the system permits the user to switch among different documents to edit, and to perform different tasks on the appropriate documents, without opening and closing windows. A document that is editable in place may be edited with the software tools of a target workbench (step 502). If the document is not editable in place, then the system edits the document in a new window using the target workbench (step 504).

Still referring to FIG. 5, Routine D checks if the selected object can reference the target workbench (step 510). If so, the system creates a new document of a type that is associated with the target workbench and references the document in the current object (step 512), and then proceeds to Routine C. If not, the system switches to the target workbench, creates a new document, and edits in new window with the tools of the target workbench (step 514).

Figure 6:
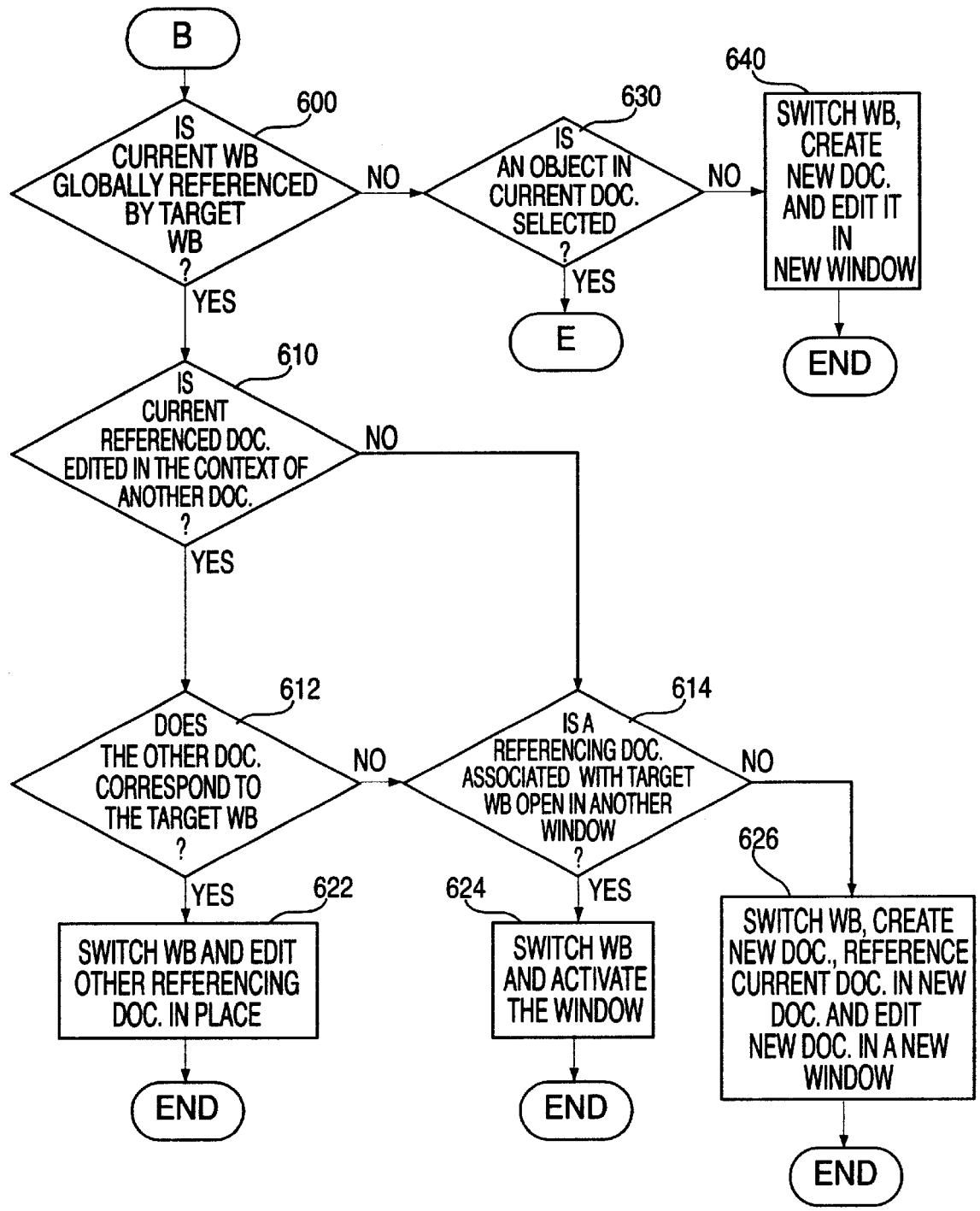
FIG. 6 is a flow-chart of the software system functionality.

Referring to FIG. 6, when Routine B starts, the system first checks whether the current workbench is globally referenced by the target workbench, meaning that the current workbench would be associated with an entire document that is referenced by the target workbench, as in Type 1 or Type 3 referencing (step 600). If so, the system checks if the current referenced document is edited in the context of another document, meaning that the referenced document is contained within, or is a piece of, another document (step 610). If so, the system checks if the other document is associated with the target workbench (step 612). If so, then the referenced document is open in the context of a higher referencing document that is simultaneously open in the same window, so the system switches to the target workbench and edits the referencing document in place, without opening a new window (step 622).

If the current document is not edited in the context of another document or if the current document is referenced by a document that is not associated with the target workbench, the system checks if a referencing document associated with the target workbench is open in another window (step 614). If so, the system switches to the target workbench and activates the other window to edit the referencing document (step 624). If not, the system switches to the target workbench, creates a new higher level document, references the current document in the new document, and edits the new document in a new window (step 626).

Further referring to FIG. 6, if the current workbench is not globally referenced by the target workbench then the system checks if an object has been selected in the current document (step 630). If so, the system proceeds to Routine E (described below), but if not, the system switches to the target workbench, creates a new document associated with the target workbench, and edits the new document in a new window (step 640).

Thus, if a current workbench is referenced by a target workbench, where possible the system will edit in place a referencing document associated with the target workbench (step 622). If a referencing document exists, but is open in another window, the system will switch to that window and edit the referencing document (step 624). Where no referencing can be found, the system will create a new document, reference the current document in the new document, and begin editing the new document in a new window with the target workbench (step 626). If the entire current document is not referenced by the target workbench, but an object in the current document is referenced, then the system enters Routine E (step 630). As a final resort, the system will create a new, unreferencing document and edit it in a new window (step 640). The system therefore manages documents and objects according to the user's choice of task, as characterized by his choice of target workbench. The system uses the predetermined references between workbenches to efficiently manage the display, creation, and organization of documents and objects.

Figure 7:
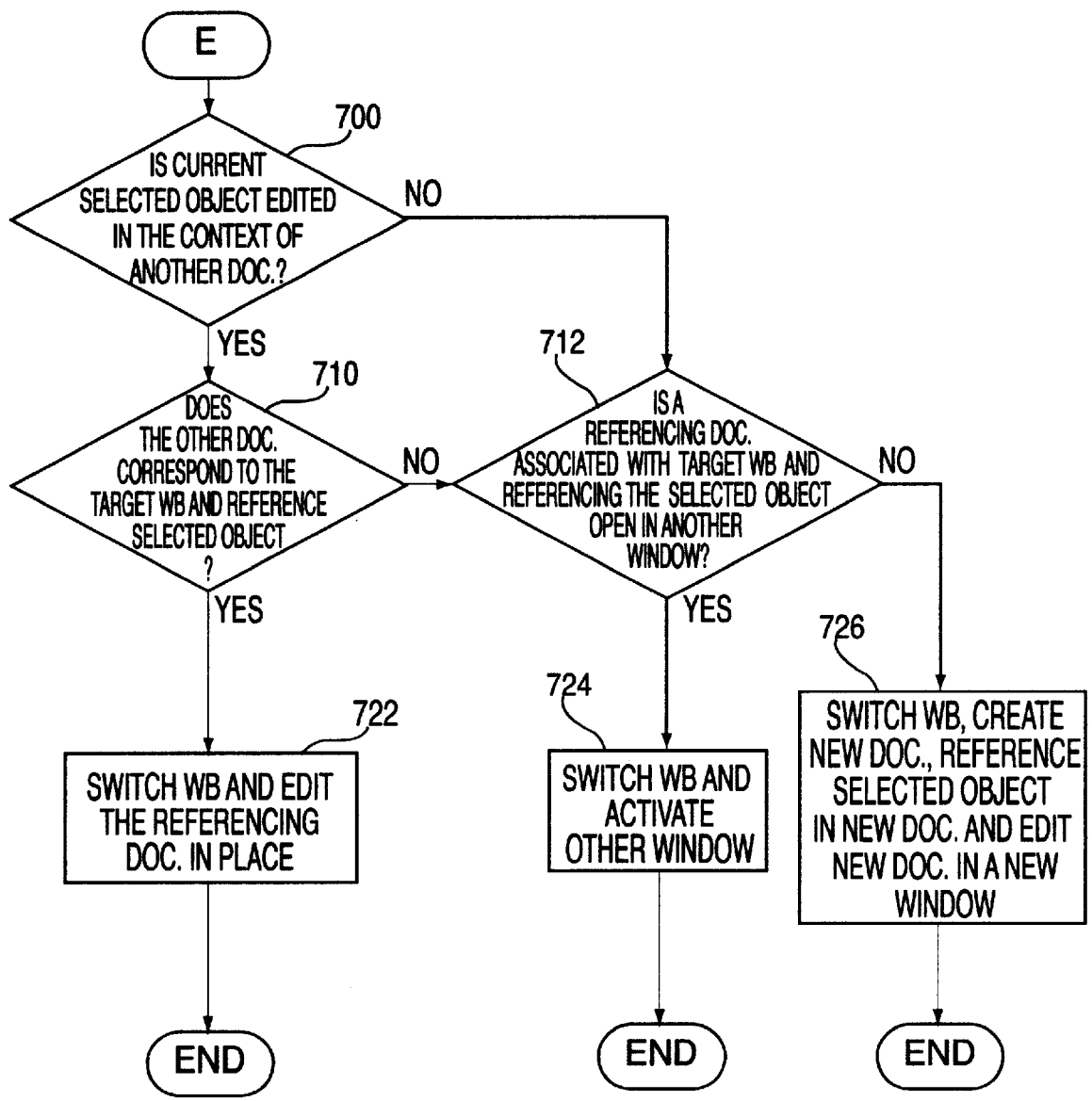
FIG. 7 is a flow-chart of the software system functionality.

Referring to FIG. 7, Routine E begins if the target workbench references the current workbench, but the reference is not global, and if there is a selected object in the current document. The system first checks if the current selected object is edited in the context of another document, meaning that the selected object is contained within, or a part of, another document (step 700). If so, the system checks if the other document is associated with the target workbench and if the other document references the selected object (step 710). If so, the system switches to the target workbench and edits the referencing document in place (step 712). If not, or if the selected object is not edited in the context of another document, the system checks if there is open anywhere in another window a document referencing the selected object and associated with the target workbench (step 712). If so, the system switches to the target workbench and activates the referencing document in the other window (step 724). If not, the system switches to the target workbench, creates a new document, references the selected object in the new document and edits the new document in a new window with the target workbench (step 726).

Figure 8A:
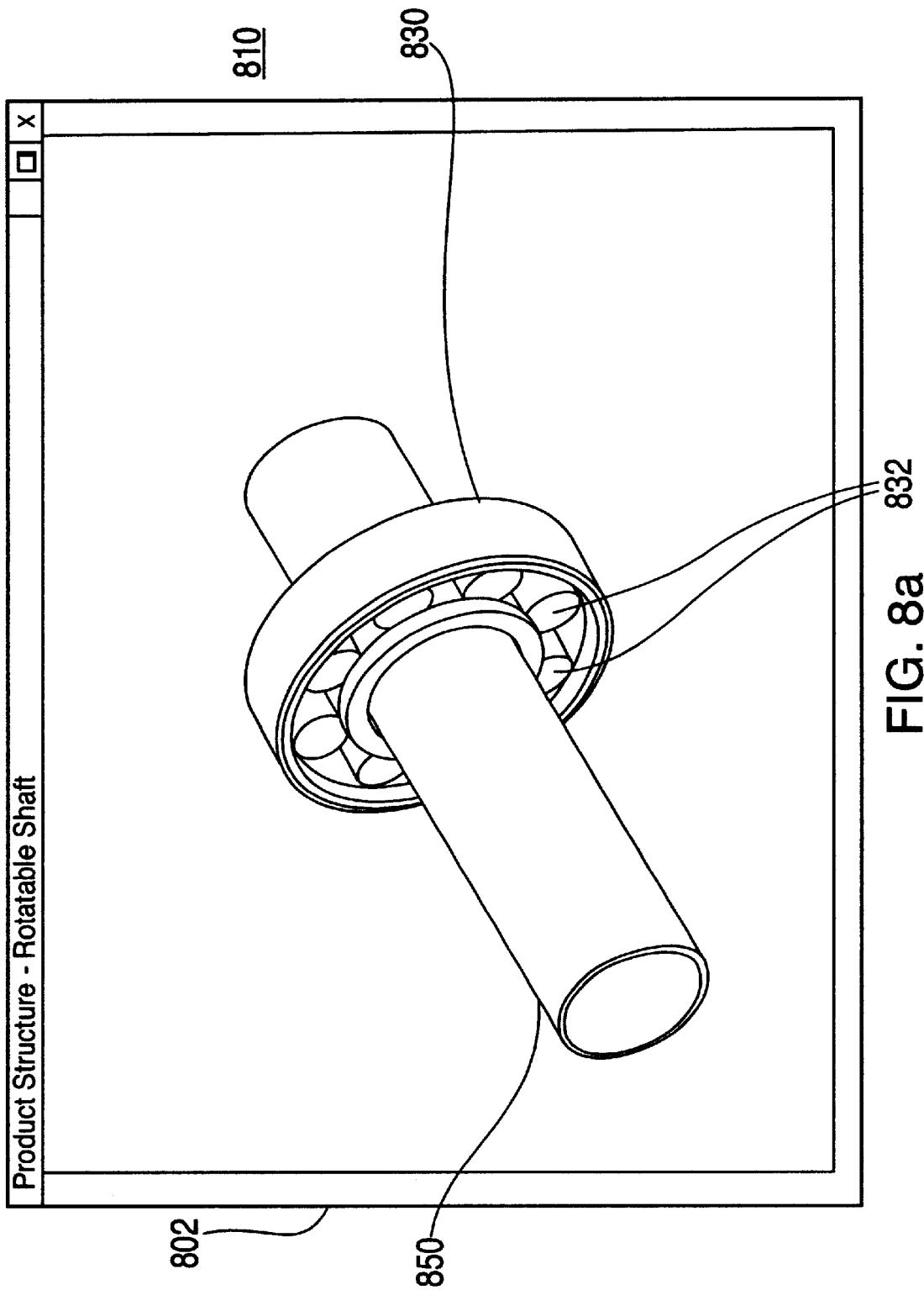
FIG. 8 shows an example of how workbench based software functionality is used.
Figure 8B:
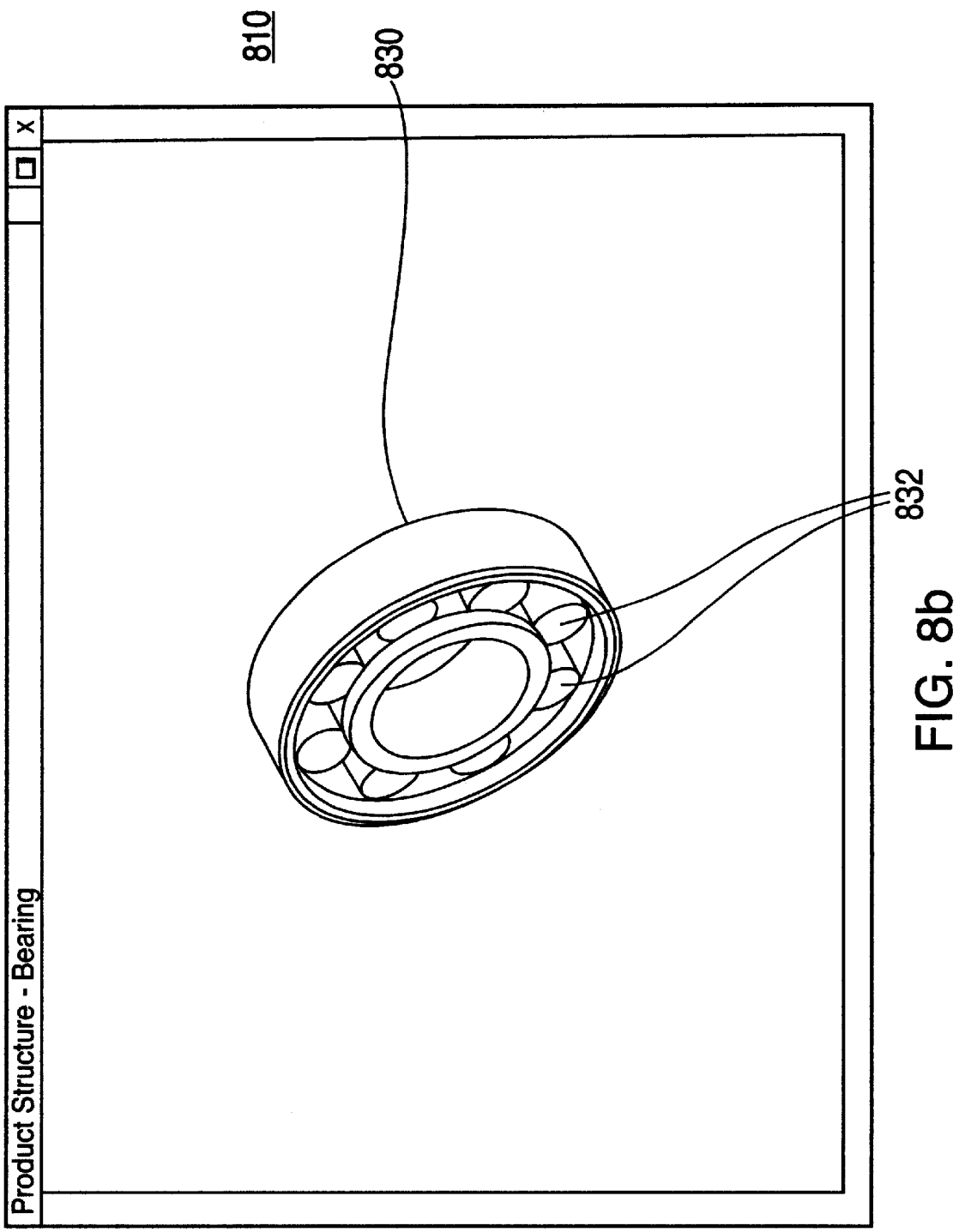
Figure 8C:
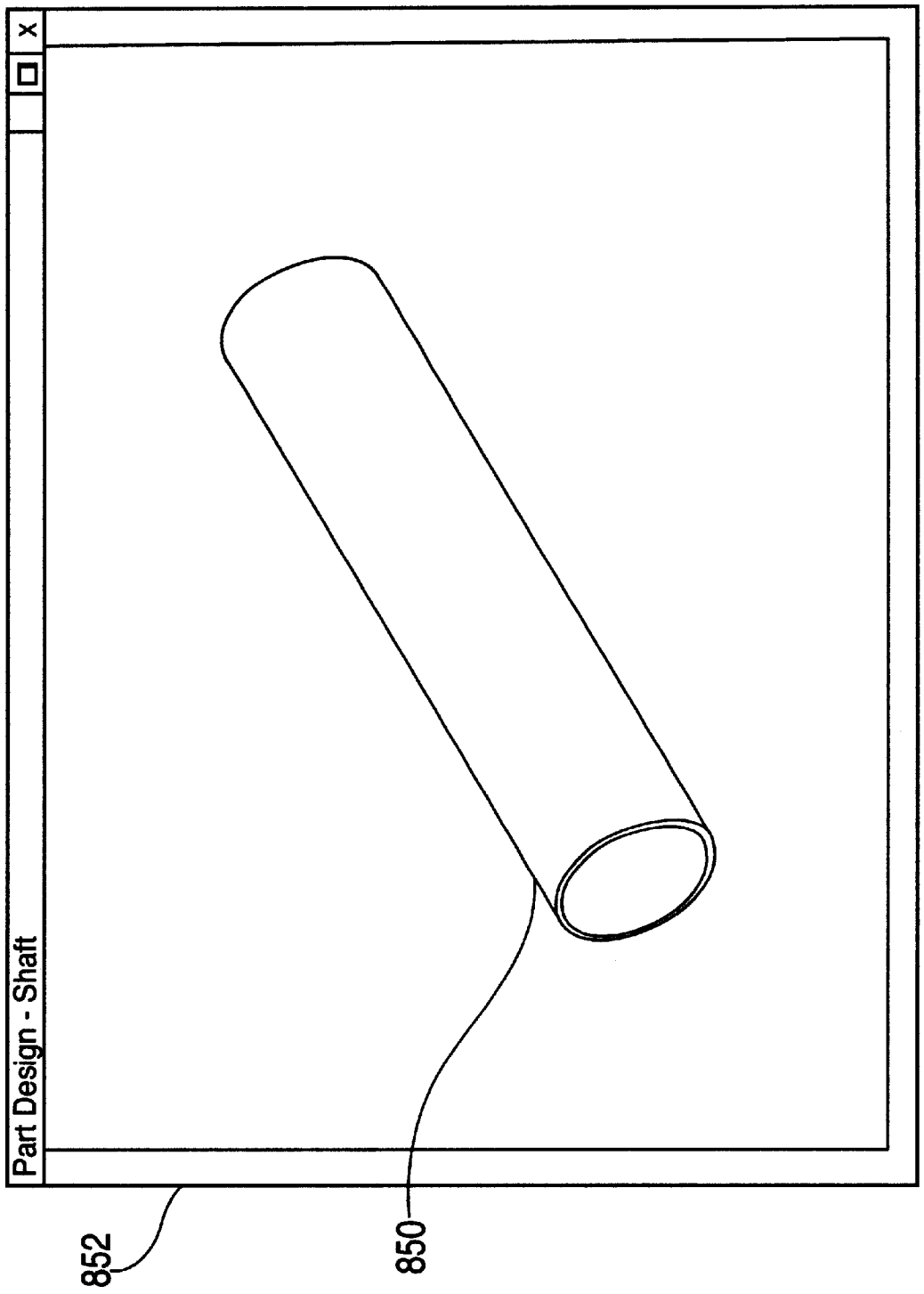

FIG. 8 can be used to demonstrate some aspects of the workbench concept and how referencing between workbenches is used to manage the display, creation and organization of documents and objects. FIG. 8*a* shows a product structure document entitled "Rotatable Shaft" 810, and FIGS. 8*b* and 8*c* show documents entitled "Bearing" 830 and "Shaft" 850, respectively.

In FIG. 8*b* the bearing 830 is a product structure document and contains roller bearing objects 832. The roller bearing objects 832 contained within the bearing 830 are also associated with the part design workbench. The shaft product structure document 850, shown in FIG. 8*c,* and the bearing product structure document 830 are assembled in the rotatable shaft product structure document 810. The product structure document 810 is associated with the part assembly workbench. In the example demonstrated in FIG. 8, upon installation of the system, the part assembly workbench may be defined to reference the part design workbench and may be defined to do so by way of document to document referencing, i.e. Type 1 referencing as shown in FIG. 9.

Referring to FIG. 8*a,* if a user is using the part assembly workbench to work on the rotatable shaft document 810 in a part assembly window 802, the user may decide to modify the length of the shaft 850. To do so, the user will need to use the part design workbench. If the shaft document 850 is already open in another window then choosing the part design workbench activates the shaft part design window and the tools of the part design workbench (according to step 412). If the shaft part design document 850 exists, but is not open in another window then the system will get the shaft part design document (according to step 414) and will edit it in the part assembly window 802 with the tools of the part design workbench (according to step 502).

Referring to FIG. 8c, if a user is using the part design workbench to work on the shaft part design document 850 in part design window 852, the user may decide to assemble the shaft with the bearing into a rotatable shaft. To do so, the user will need to use the part assembly workbench. If the rotatable shaft product structure document has not already been created the system will create it and will reference the shaft part design document in it (according to step 626). If the rotatable shaft part assembly document is open in another window the system will activate it and begin editing it with the part assembly workbench (according to step 624).

Referring to FIG. 8a, if a user is using the part design workbench to work on the shaft part design document 850 in part assembly window 802, the user may decide to modify the assembly of the shaft with the bearing which forms the rotatable shaft. To do so, the user will need to use the part assembly workbench. Since the user is already in the part assembly window the system will simply switch to the part assembly workbench and edit the rotatable shaft product structure document in place.

What is claimed is:

1. A method of operating a CAD/CAM/CAE computer system containing a plurality of software tools, each of said software tools being used by a user to perform one or more particular actions as part of the user's use of the software system, said method comprising:

organizing said plurality of software tools into a plurality of workbenches, each workbench comprising a different subset of said plurality of software tools, each different subset comprising software tools generally required by the user to perform a specific task;

defining a hierarchy among the workbenches of said plurality of workbenches, said hierarchy comprising at least one reference from at least one workbench to at least one other workbench;

storing a record of said hierarchy on said computer system; and using a workbench to work on a document, wherein the document comprises one of a plurality of predetermined document types, and wherein the document is of a document type associated with the workbench.

2. A method of claim 1 further comprising:

using one or more workbenches to work on one or more documents, each workbench being associated with at least one document, type of a plurality of predetermined document types, and each document having a document type;

displaying to the user a list of available workbenches;

monitoring the entry of a command by the user;

if the command entered by the user indicates the selection of a workbench, creating a new document, the type of said new document being a document type associated with said workbench; and if the command entered by the user indicates the selection of an existing document, retrieving said existing document, displaying said existing document to the user in the context of a workbench associated with the document type of said existing document.

3. The method of claim 2, further comprising:

establishing in one or more of said documents one or more references to one or more other documents;

upon selection by a user, working on a first document with a first workbench, of a second workbench, looking up said stored hierarchy; and a. if a reference exists from said first workbench to said second workbench or if a reference exists from said second workbench to said first workbench, and b. if a document of a document type associated with said second workbench exists on the computer system, and c. if said document refers to, or is referred to by, said first document, displaying to the user said document in the context of said second workbench.

4. The method of claim 3 wherein checking whether a reference exists from said first workbench to said second workbench comprises:

a. if said hierarchy comprises a reference from said first workbench to said second workbench, and b. if there exists an open document of a type associated with said second workbench, and c. if said open document is referenced by said first document, displaying to the user an open document in the context of said second workbench; and a. if said hierarchy comprises a reference from said first workbench to said second workbench, and b. if an open document of a type associated with said second workbench does not exist, creating a new document, referencing said new document in said first document and displaying said new document to the user in the context of said second workbench.

5. The method of claim 3 wherein checking whether a reference exists from said second workbench to said first workbench comprises:

a. if the first document is edited in the context of an other document, and b. if the other document is of a type associated with the second workbench, displaying the other document to the user;

a. if the first document is edited in the context of an other document, and b. if the other document is not of a type associated with the second workbench, and c. if there exists an open document in another window that comprises a reference to said first document, displaying said open document to the user;

a. if the first document is not edited in the context of an other document, and b. if there exists an open document in another window that comprises a reference to said first document, displaying said open document to the user;

a. if the first document is edited in the context of an other document, and b. if the other document is not of a type associated with the second workbench, and c. if there does not exist an open document in another window that comprises a reference to said first document, creating a new document, referencing said first document in said new document and displaying said new document to the user in the context of said second workbench; and a. if the first document is not edited in the context of an other document, and b. if there does not exist an open document in another window that comprises a reference to said first document, creating a new document, referencing said first document in said new document and displaying said new document to the user in the context of said second workbench.

6. A computer program residing on a computer-readable medium, comprising instructions for causing a CAD/CAM/CAE computer system containing a plurality of software tools, each of said software tools being used by a user to perform one or more particular actions as part of the user's use of the software system, to:

organize said plurality of software tools into a plurality of workbenches, each workbench containing a different subset of said plurality of software tools, each different subset comprising the software tools generally required by the user to perform a specific task;

define a hierarchy among the workbenches of said plurality of workbenches, said hierarchy comprising at least one reference from at least one workbench to at least one other workbench;

store said hierarchy on said computer system; and use a workbench to work on document, wherein the document comprises one of a plurality of predetermined document types, and wherein the document is of a document type associated with the workbench.

7. The computer program of claim 6 further comprising instructions to:

use one or more workbenches to work on one or more documents, each workbench being associated with at least one document type of a plurality of predetermined document types, and each document having a document type;

display to the user a list of available workbenches;

monitor the entry of a command by the user;

create a new document if the command entered by the user indicates the selection of a workbench, the type of said new document being a document type associated with said workbench; and if the command entered by the user indicates the selection of an existing document, retrieve said existing document, display said existing document to the user in the context of a workbench associated with the document type of said existing document.

8. A computer-implemented method for processing data modeling an object, where the data modeling the object comprises a plurality of hierarchically related files each of the files comprising data defining structural elements of the modeled object and each of the files having associated with it one of a plurality of file types, the file types indicative of a type of structural element defined by data in the associated file, and the method comprising:

functionally associating each of a plurality of workbenches with a different one of the plurality of file types, each of the workbenches comprising a set of software tools comprising functionality for editing data contained in the associated file;

displaying on an output device a representation of the modeled object;

receiving from a user a selection of one of the plurality of workbenches; and in response to the user selection, automatically invoking functionality of the workbench to process data in a file of a type associated with the selected workbench.

9. The method of claim 8 wherein each of the plurality of files is stored separately on a computer's file system.

10. The method of claim 8 wherein the plurality of workbenches comprise a part design workbench comprising functionality for the creation of part elements and a part assembly workbench comprising functionality to structurally relate a plurality of part elements forming the modeled object.

11. The method of claim 10 wherein the plurality of workbenches further comprise a product structure workbench, a navigator workbench, and an analysis workbench.

12. The method of claim 8 wherein automatically invoking comprises:

creating a file of a type associated with the selected workbench and structurally relating the created file to the modeled object.

13. The method of claim 12 wherein structurally relating the created file comprises generating referencing data and storing the referencing data in a first one of the plurality of related files.

14. The method of claim 12 further comprising:

receiving from the user a selection of a structural element of the modeled object prior to receiving the selection of the one of the plurality of workbenches; and wherein structurally relating the created file comprises structurally relating the created file to the selected element.

15. The method of claim 14 wherein:

the selected element comprises a part element defined by data in a part file;

the selected workbench comprises a part assembly workbench;

the created file comprises a part assembly file; and structurally relating the created file to the selected element comprises storing data in the part assembly file defining a relationship between the selected element and at least one other element of the modeled object.

16. A computer-implemented method for processing data modeling an object, where the data modeling the object comprises a plurality of hierarchically related files each of the files comprising data defining structural elements of the modeled object and each of the files having associated with it one of a plurality of file types, the file types indicative of a type of structural element defined by data in the associated file, and the method comprising:

functionally associating each of a plurality of workbenches with a different one of the plurality of file types, each of the workbenches comprising a set of software tools comprising functionality for editing data contained in the associated file;

displaying on an output device a representation of the modeled object comprising a plurality of structural elements, each structural element being modeled based on data in an associated one of the plurality of hierarchically related files;

receiving from a user a selection of one of the structural elements; and in response to the user selection, automatically invoking an associated first workbench to modify data in a first one of the related file that comprises data defining the selected element.

17. The method of claim 16 wherein the different file types comprise a part type and an assembly type, each part type file comprising data modeling a physical element of the modeled object, and the assembly type file containing data structurally interrelating a plurality of physical elements.

18. The method of claim 16 wherein the plurality of workbenches are hierarchically related and the method further comprising:

while the first workbench is in use to process data in the first one of the related files, receiving from the user a selection of a second one of the workbenches;

selecting an existing file stored at the computer system based on a hierarchical relationship between the first and the second workbenches; and displaying to the user a structural element in said existing file.

19. A computer-implemented method for processing data in a plurality of files that are interrelated to form a single logical data object, where each of the plurality of files has associated with it one of a plurality of file types indicative of the expressive content of the associated file, and the method comprising:

functionally associating each of a plurality of workbenches with a different one of the plurality of file types, each of the workbenches comprising a set of software tools comprising functionality for editing data contained in the associated file;

displaying on an output device a representation of the single logical data object;

receiving from a user a selection of one of the plurality of workbenches; and in response to the user selection, automatically invoking functionality of the workbench to process data in a file of a type associated with the selected workbench.

20. The method of claim 19 wherein automatically invoking comprises:

creating a file of a type associated with the selected workbench and structurally relating the created file to the single logical data object.

21. The method of claim 20 wherein structurally relating the created file comprises generating referencing data and storing the referencing data in a first one of the plurality of related files.

22. A computer apparatus for processing data modeling an object, where the data modeling the object comprises a plurality of hierarchically related files each of the files comprising data defining structural elements of the modeled object and each of the files having associated with it one of a plurality of file types, the file types indicative of a type of structural element defined by data in the associated file, and the apparatus comprising data storage comprising instructions to configure a processor to:

functionally associate each of a plurality of workbenches with a different one of the plurality of file types, each of the workbenches comprising a set of software tools comprising functionality for editing data contained in the associated file;

display on an output device a representation of the modeled object;

receive from a user a selection of one of the plurality of workbenches; and in response to the user selection, automatically invoke functionality of the workbench to process data in a file of a type associated with the selected workbench.

23. The apparatus of claim 22 wherein the plurality of workbenches comprise a part design workbench comprising instructions to configure the processor to create part elements and a part assembly workbench comprising instructions to configure the processor to structurally relate a plurality of part elements to form the modeled object.

24. The apparatus of claim 22 wherein the instructions to automatically invoke comprise instructions to create a file of a type associated with the selected workbench and instructions to configure the processor to structurally relate the created file to the modeled object.

25. The apparatus of claim 22 wherein the instructions to structurally relate the created file comprises instructions to configure the processor to generate referencing data and store the referencing data in a first one of the plurality of related files.

26. The apparatus of claim 22 further comprising instructions to configure the processor to:

receive from the user a selection of a structural element of the modeled object prior to receiving the selection of the one of the plurality of workbenches; and wherein the instructions to structurally relate the created file comprises instructions to structurally relate the created file to the selected element.

* * * * *

UNITED STATES PATENT AND TRADEMARK OFFICE
CERTIFICATE OF CORRECTION

PATENT NO.     : 6,499,040 B1
DATED          : December 24, 2002
INVENTOR(S)    : Duy-Minh Vu et al.

It is certified that error appears in the above-identified patent and that said Letters Patent is hereby corrected as shown below:

<u>Column 13,</u>
Line 48, "document, type" should read -- document type --.

Signed and Sealed this

Eleventh Day of March, 2003

JAMES E. ROGAN
*Director of the United States Patent and Trademark Office*